United States Patent
Iwamoto et al.

(10) Patent No.: US 8,549,845 B2
(45) Date of Patent: Oct. 8, 2013

(54) EXHAUST PURIFICATION DEVICE FOR INTERNAL COMBUSTION ENGINE

(75) Inventors: Jun Iwamoto, Saitama (JP); Go Motohashi, Saitama (JP); Hitoshi Mikami, Saitama (JP); Shinya Ishimaru, Saitama (JP); Katsuji Wada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 511 days.

(21) Appl. No.: 12/747,440

(22) PCT Filed: Nov. 5, 2008

(86) PCT No.: PCT/JP2008/070072
§ 371 (c)(1),
(2), (4) Date: Jun. 10, 2010

(87) PCT Pub. No.: WO2009/075148
PCT Pub. Date: Jun. 18, 2009

(65) Prior Publication Data
US 2010/0257845 A1    Oct. 14, 2010

(30) Foreign Application Priority Data
Dec. 13, 2007 (JP) ................................. 2007-322568

(51) Int. Cl.
*F01N 3/00* (2006.01)
(52) U.S. Cl.
USPC ................... 60/295; 60/286; 60/289; 60/301
(58) Field of Classification Search
USPC ................................................. 60/274–301
See application file for complete search history.

(56) References Cited

U.S. PATENT DOCUMENTS

| | | | |
|---|---|---|---|
| 5,412,946 A | 5/1995 | Oshima et al. | |
| 6,804,952 B2 * | 10/2004 | Sasaki et al. | 60/284 |
| 6,823,662 B1 | 11/2004 | Yamamoto et al. | |
| 7,225,612 B2 * | 6/2007 | Bernler et al. | 60/295 |
| 7,254,939 B2 * | 8/2007 | Duvinage et al. | 60/286 |

(Continued)

FOREIGN PATENT DOCUMENTS

| | | |
|---|---|---|
| CA | 2 406 386 A1 | 1/2003 |
| EP | 0 537 968 A1 | 4/1993 |

(Continued)

*Primary Examiner* — Kenneth Bomberg
*Assistant Examiner* — Jesse Bogue
(74) *Attorney, Agent, or Firm* — Arent Fox LLP (57) ABSTRACT

An exhaust purification device for an internal combustion engine is provided that can promote the reduction of NOx in a NOx purification catalyst from immediately after startup of the internal combustion engine. The exhaust purification device includes: a fuel reformer that is provided separately from exhaust plumbing 4, reforms fuel and produces a reducing gas that contains carbon monoxide, hydrogen and hydrocarbons, and supplies the reducing gas upstream of the NOx purification catalyst into the exhaust path; an exhaust gas temperature sensor 34 that detects a temperature $T_{EX}$ of the exhaust flowing in the exhaust plumbing 4; and a reformer control part 41 that starts supply of the reducing gas to the exhaust plumbing 4 by starting control of the fuel reformer 50 in a case where the temperature $T_{EX}$ thus detected by this exhaust gas temperature sensor 34 is no higher than a predetermined first determination temperature T1, and stops the supply of reducing gas to the exhaust plumbing 4 by stopping control of the fuel reformer 50 in a case where the temperature detected by the exhaust gas temperature sensor 34 is at least a second determination temperature T2, which is higher than the first determination temperature.

12 Claims, 3 Drawing Sheets

(56) References Cited

U.S. PATENT DOCUMENTS

| | | | |
|---|---|---|---|
| 7,717,099 B2 * | 5/2010 | Nagae et al. | 123/568.21 |
| 8,006,484 B2 * | 8/2011 | Dalla Betta | 60/288 |
| 8,096,111 B2 * | 1/2012 | Hoard et al. | 60/295 |
| 8,453,433 B2 * | 6/2013 | Wada et al. | 60/286 |
| 2001/0011539 A1 * | 8/2001 | Ito et al. | 123/518 |
| 2003/0163988 A1 * | 9/2003 | Kirwan et al. | 60/289 |
| 2004/0237507 A1 | 12/2004 | Duvinage et al. | |
| 2005/0274107 A1 * | 12/2005 | Liu et al. | 60/286 |
| 2009/0120075 A1 * | 5/2009 | Kato | 60/297 |
| 2010/0126142 A1 * | 5/2010 | Murata et al. | 60/278 |

FOREIGN PATENT DOCUMENTS

| | | |
|---|---|---|
| EP | 1 607 133 A1 | 12/2005 |
| JP | 5-106430 A | 4/1993 |
| JP | 7-127447 A1 | 5/1995 |
| JP | 09-303142 | 11/1997 |
| JP | 10-030430 | 2/1998 |
| JP | 2001-113134 A | 4/2001 |
| JP | 2001-234737 A | 8/2001 |
| JP | 2001-295708 A | 10/2001 |
| JP | 2002-235594 | 8/2002 |
| JP | 3454336 B2 | 7/2003 |
| JP | 2004-245046 A | 9/2004 |
| JP | 2004-532374 A | 10/2004 |
| JP | 3627372 B2 | 12/2004 |
| JP | 3740987 B2 | 11/2005 |
| JP | 2006-512523 A | 4/2006 |
| WO | WO 2007/066835 A1 | 6/2007 |

* cited by examiner

EXHAUST PURIFICATION DEVICE FOR INTERNAL COMBUSTION ENGINE

CROSS-REFERENCED TO RELATED APPLICATION

This application is a National Stage entry of International Application No. PCT/JP2008/070072, filed Nov. 5, 2008, which claims priority of JP 2007-322568, filed Dec. 13, 2007. The disclosure of the prior application is hereby incorporated in its entirety by reference.

TECHNICAL FIELD

The present invention relates to an exhaust purification device for an internal combustion engine. More specifically, it relates to an exhaust purification device for an internal combustion engine provided with a NOx purification catalyst that purifies NOx in exhaust gas.

BACKGROUND ART

Conventionally, a lean NOx catalyst has been known in which, when the exhaust is an oxidizing atmosphere, (when the concentration of oxygen in the exhaust is high relative to the concentration of reducing components (HC, CO)), nitrogen oxides (NOx) in the exhaust is absorbed, and when the exhaust is a reducing atmosphere (when the concentration of reducing components in the exhaust is high relative to the concentration of oxygen), the NOx thus absorbed is reduced. In an exhaust purification device provided with such a lean NOx catalyst, the absorption and reduction of NOx is repeated by making the exhaust air-fuel ratio (mass ratio of air to combustible gas in the exhaust path) to be lean and then rich.

As a method for controlling the exhaust air-fuel ratio, there is a method in which the exhaust air-fuel ratio is made low (hereinafter referred to as "enriching") by reducing the intake air amount of the engine and adjusting the fuel injection (hereinafter referred to as "main injection") amount contributing to torque (hereinafter referred to as "method by rich combustion"), and a method in which the exhaust air-fuel ratio is enriched by performing fuel injection that does not contribute to torque (hereinafter referred to as "post injection") to flow unburned fuel into the exhaust path (hereinafter referred to as "method by post rich"). In addition, alternatively, a method has also been known in which fuel is directly injected into the exhaust path (hereinafter referred to as "method by exhaust injection").

In Patent Document 1 and Patent Document 2, inventions that apply this method by exhaust injection are exemplified.

More specifically, in Patent Document 1, an exhaust purification device is further exemplified in which a lean NOx catalyst is provided in an exhaust path, an oxidation catalyst is disposed upstream of this lean NOx catalyst, and a reducing agent such as diesel oil is supplied from upstream of this oxidation catalyst. In this exhaust purification device in particular, at an initial stage among the intervals in which the reducing agent is supplied, combustion of the reducing agent in the oxidation catalyst is promoted by way of including hydrogen, which is high in low temperature oxidizability, in the reducing agent, and the exhaust is made a reducing atmosphere even in a case where the exhaust temperature is low, while reduction of NOx in the lean NOx catalyst is promoted.

In addition, in Patent Document 2, an exhaust purification device is exemplified that has an oxidation catalyst in the exhaust path of a diesel engine, and supplies a reducing agent such as diesel oil to this oxidation catalyst. In this exhaust purification device in particular, the intake air flow rate into the diesel engine is no more than a predetermined value, and in a case where the temperatures of the oxidation catalyst and exhaust are at least a predetermined temperature at which NO is oxidized by the oxidation catalyst to generate $NO_2$, the reducing agent is supplied, whereby emission of $NO_2$ is controlled.

However, in the methods by exhaust injection such as those exemplified in Patent Documents 1 and 2, and the method by post rich described above, when a reducing agent is supplied in a state in which the exhaust temperature is low, the exhaust gas temperature declines further due to the latent heat of vaporization of the reducing agent, and the reducing agent may remain in the exhaust path without vaporizing. In addition, in a case of, immediately after startup of the engine, there being a state in which the lean NOx catalyst has not achieved the activation temperature, reduction of NOx cannot be promoted, even if the exhaust air-fuel ratio is made low by supplying such a reducing agent.

Moreover, when enriching the exhaust air-fuel ratio by a method of rich combustion as described above, the operating conditions are limited. For example, during high-load operation in which combustion is sharp, the combustion noise grows worse. In addition, during low-load operation such as immediately after startup of the engine or while idling, the charge efficiency into the cylinders decreases and combustion may become unstable.

Accordingly, an exhaust purification device has been proposed that reforms fuel with a reforming catalyst to produce a reducing gas, which is more highly reducing, such as hydrogen ($H_2$) and carbon monoxide (CO), and uses this reducing gas to improve the reduction performance of the lean NOx catalyst while at low temperatures.

Herein, as the reforming reaction of the reforming catalyst, for example, a reaction has been known that produces a gas containing hydrogen and carbon monoxide by the partial oxidation reaction of hydrocarbons such as that shown in the following formula.

$$C_nH_m + \tfrac{1}{2}nO_2 \rightarrow nCO + \tfrac{1}{2}mH_2$$

This partial oxidation reaction is an exothermal reaction employing fuel and oxygen, and the reaction progresses spontaneously. As a result, upon the reaction being started, it is possible to continuously produce hydrogen without the supply of heat from outside. In addition, in this kind of partial oxidation reaction, in a case in which fuel and oxygen coexist in a high temperature state, the combustion reaction as shown in the following formula also progresses on the reforming catalyst.

$$C_nH_m + (n+\tfrac{1}{4}m)O_2 \rightarrow nCO_2 + \tfrac{1}{2}mH_2O$$

As the reforming reaction, in addition to the partial oxidation reaction, the steam reforming reaction as shown in the following formula has also been known.

$$C_nH_m + nH_2O \rightarrow nCO + (n+\tfrac{1}{2}m)H_2$$

This steam reforming reaction is an endothermic reaction employing fuel and steam, and is not a reaction that progresses spontaneously. As a result, the steam reforming reaction is easily controlled relative to the partial oxidation reaction described above. On the other hand, it is necessary to input energy such as of a heat supply from outside.

In Patent Document 3, a device is exemplified that is provided with such a reforming catalyst as described above upstream of a lean NOx catalyst in the exhaust path. In this exhaust purification device in particular, a catalyst capable of performing a plurality of different reforming reactions such as the partial oxidation reaction, steam reforming reaction and water-gas shift reaction is employed as the reforming catalyst. In addition, when NOx desorbs from the lean NOx catalyst, the exhaust air-fuel ratio is enriched, and the main reforming reaction in the reforming catalyst is also switched by switching enrichment control of the exhaust air-fuel ratio according to the temperature of the exhaust. This exhaust purification device has an object of producing the hydrogen necessary in reductive purification of NOx irrespective of the temperature of the exhaust by switching the reforming reaction according to the temperature.

Patent Document 1: Japanese Patent No. 3454336
Patent Document 2: Japanese Patent No. 3627372
Patent Document 3: Japanese Patent No. 3740987

DISCLOSURE OF THE INVENTION

Problems to be Solved by the Invention

The exhaust purification device exemplified in Patent Document 3 was aimed at producing hydrogen stably irrespective of the temperature of exhaust by switching the main reforming reaction in the reforming catalyst according to the temperature of the exhaust. However, it is necessary to raise the temperature of the reforming catalyst up to at least 600° C. in the case of performing the partial oxidation reaction and steam reforming reaction, and up to at least 200° C. in the case of performing the water gas shift reaction. Therefore, in a state in which the temperature of the exhaust is low immediately after startup, raising the reforming catalyst temperature up to an activation temperature such as that described above is difficult, and thus creating a reducing gas is difficult. Accordingly, in such a state of the exhaust being a low temperature, efficient reductive purification of NOx is difficult.

The present invention has been made considering the problems described above, and has an object of providing an exhaust purification device for an internal combustion engine, which is provided with a NOx purification catalyst that purifies NOx in exhaust, that can promote the reduction of NOx in the NOx purification catalyst from immediately after startup of the internal combustion engine.

Means for Solving the Problems

In order to achieve the above-mentioned object, the present invention provides an exhaust purification device for an internal combustion engine, which is provided with a NOx purification catalyst (33) that is disposed in an exhaust path (4) of an internal combustion engine (1), and purifies NOx in the exhaust. The exhaust gas purification device includes: a fuel reformer (50) that is provided separately from the exhaust path, reforms fuel and produces a reducing gas containing carbon monoxide, hydrogen, and hydrocarbons, and supplies the reducing gas upstream of the NOx purification catalyst into the exhaust path; a temperature detection means (34) for detecting a temperature ($T_{EX}$) of exhaust flowing in the exhaust path, or a temperature ($T_{CA}$) of the NOx purification catalyst; and a reformer control means (41) for starting supply of reducing gas to the exhaust path by starting control of the fuel reformer in a case where the temperature thus detected by the temperature detection means is no higher than a predetermined first temperature ($T_1$), and stops supply of reducing gas to the exhaust path by stopping control of the fuel reformer in a case where the temperature thus detected by the temperature detection means becomes at least a second temperature ($T_2$) that is higher than the first temperature.

According to this configuration, in a case where the temperature thus detected by the temperature detection means is no higher that the first temperature, control of the fuel reformer is started, and thus supply of reducing gas to the exhaust path is started, and thereafter, in a case where the temperature thus detected by the temperature detection means is at least the second temperature, control of the fuel reformer is stopped, and thus the supply of reducing gas to the exhaust path is stopped.

As a result, the exhaust flowing into the NOx purification catalyst can be made to be a reducing atmosphere even in a case in which the temperature of the exhaust or the temperature of the NOx purification catalyst is no higher than the first determination temperature and the exhaust cannot be made a reducing atmosphere by way of methods such as rich combustion, post injection or exhaust injection described above, by supplying the reducing gas thus produced in the fuel reformer. This makes it possible to reduce and purify NOx with the NOx purification catalyst even in a case in which the exhaust is a low temperature immediately after startup of the internal combustion engine.

In addition, by supplying reducing gas to the NOx purification catalyst by operating in this way, reduction and purification of NOx in the NOx purification catalyst 33 is promoted by making the exhaust a reducing atmosphere and it is possible to raise the temperature of the NOx purification catalyst by combusting a portion of the reducing gas herein that is surplus. Therefore, it is possible to quickly raise the temperature of the NOx purification catalyst immediately after startup of the internal combustion engine and the like, without performing complicated combustion control to raise the temperature of the exhaust and without providing additional equipment.

In addition, the fuel reformer is provided separately from the exhaust path. As a result, it is possible to control the fuel reformer and the internal combustion engine as separate systems. That is to say, contrary to the exhaust purification device exemplified in Patent Document 3 described above, in controlling the fuel reformer, it becomes unnecessary to control the state of the exhaust emitted from the internal combustion engine. As a result, it becomes possible to control the internal combustion engine so that the combustion conditions of the internal combustion engine are in an optimal range. At the same time, it is also possible to operate at optimal conditions by making the fuel reformer independent from control of the internal combustion engine.

Preferably, the reformer control means controls the fuel reformer from when a supply amount of the reducing gas to the exhaust path per unit time reaches a predetermined target supply amount so as to maintain the target supply amount.

According to this configuration, the reformer control means steadily operates the fuel reformer so that the supply amount of reducing gas per unit time to the exhaust path is constant at a target supply amount. In other words, according to this configuration, complicated control such as changing the supply amount of reducing gas according to the operation state of the internal combustion engine, state of the exhaust, or the like is not performed. As a result, the structure of the device for control of the fuel reformer is made simple, whereby cost can be reduced.

Preferably, the NOx purification catalyst absorbs nitrogen oxide in exhaust when an exhaust air-fuel ratio is lean, and reduces the nitrogen oxide thus absorbed when the exhaust air-fuel ratio is rich. The exhaust purification device further includes an exhaust air-fuel ratio control means (421) for making the exhaust air-fuel ratio to be lean and to be rich by controlling a main injection amount or post injection amount of fuel injected into a combustion chamber of the internal combustion engine, after supply of the reducing gas by way of the fuel reformer has stopped.

According to this configuration, after the supply of reducing gas by way of the fuel reformer is stopped, the exhaust air-fuel ratio is made to be lean and rich by controlling the main injection amount or post injection amount. As a result, it becomes possible to continuously purify NOx with the NOx purification catalyst even after the supply of reducing gas has been stopped.

Preferably, the fuel reformer includes a reforming catalyst (53) that produces a reducing gas by reforming fuel gas in which air and fuel has been mixed. The reformer control means produces the target supply amount of reducing gas by controlling any of a supply amount of air, a supply pressure of air, a supply amount of fuel, and a supply pressure of fuel supplied to the reforming catalyst.

According to this configuration, reducing gas of a target supply amount is produced by controlling any of a supply amount of air supplied to the reforming catalyst, a supply pressure of air, a supply amount of fuel, and a supply pressure of fuel. In other words, it is not necessary to perform complicated control in order to produce reducing gas of a constant target supply amount. As a result, the structure of the device for control of the fuel reformer is made simple, whereby cost can be reduced.

Preferably, the exhaust purification device further includes: an intake control valve (12) provided in an intake path (2) of the internal combustion engine; an exhaust-gas recirculation amount control valve (20) provided in an exhaust-gas recirculation path (6) that recirculates a portion of exhaust flowing in the exhaust path into the intake path; and a space velocity control means for decreasing an intake amount by closing the intake control valve, or increasing an exhaust-gas recirculation amount by opening the exhaust-gas recirculation amount control valve, so that a space velocity of exhaust gas in the NOx purification catalyst falls below a predetermined lower limit target velocity, while supplying reducing gas to the exhaust path by way of the fuel reformer.

According to this configuration, the reducing gas is supplied at a constant target supply amount to the exhaust path, as described above. Therefore, if the intake amount decreases and the exhaust-gas recirculation amount increase, and thus the space velocity of the exhaust in the NOx purification catalyst drops, the temperature of the reducing gas of the exhaust in the NOx purification catalyst rises.

Here in particular, the exhaust in the NOx purification catalyst can be made a reducing atmosphere by decreasing the intake amount or increasing the exhaust-gas recirculation amount, so that the space velocity of the exhaust in the NOx purification catalyst falls below a predetermined lower limit target velocity. As a result, it is possible to further promote the reduction and purification of NOx in the NOx purification catalyst.

Preferably, the space velocity of exhaust gas falls below the lower limit target velocity at least one time, while supplying the reducing gas to the exhaust path by way of the fuel reformer.

According to this configuration, the space velocity of the exhaust in the NOx purification catalyst falls below the lower limit target velocity at least one time, while supplying reducing gas to the exhaust path by way of the fuel reformer. As a result, it is possible to improve the purification performance of the NOx purification catalyst while at low temperature.

Preferably, the exhaust purification device further includes: an intake control valve (12) provided in an intake path (2) of the internal combustion engine; an exhaust-gas recirculation amount control valve (20) provided in an exhaust-gas recirculation path that recirculates a portion of exhaust flowing in the exhaust path into the intake path; and an oxygen concentration control means for decreasing an intake amount by closing the intake control valve, increasing an exhaust-gas recirculation amount by opening the exhaust-gas recirculation amount control valve, or increasing a fuel injection amount to be injected into a combustion chamber of the internal combustion engine, so that an oxygen concentration of exhaust in the NOx purification catalyst falls below a predetermined lower limit target concentration, while supplying reducing gas to the exhaust path by way of the fuel reformer.

According to this configuration, the oxygen concentration of the exhaust in the NOx purification catalyst becomes low by decreasing the intake amount, increasing the exhaust-gas recirculation amount, and increasing the fuel injection amount.

Here in particular, the exhaust in the NOx purification catalyst can be made a reducing atmosphere by reducing the intake amount, increasing the exhaust-gas recirculation amount, or increasing the fuel injection amount so that the oxygen concentration of the exhaust in the NOx purification catalyst falls below a predetermined lower limit target concentration. As a result, it is possible to further promote the reduction and purification of NOx in the NOx purification catalyst.

Preferably, the oxygen concentration falls below the lower limit target concentration at least one time, while supplying reducing gas to the exhaust path by way of the fuel reformer.

According to this configuration, the oxygen concentration of the exhaust in the NOx purification catalyst falls below the lower limit target concentration at least one time, while supplying reducing gas to the exhaust path by way of the fuel reformer. As a result, it is possible to improve the purification performance of the NOx purification catalyst while at low temperature.

Preferably, the fuel reformer produces reducing gas by way of partial oxidation reaction of hydrocarbon fuel and air.

According to this configuration, by producing the reducing gas by way of the partial oxidation reaction, the reducing gas can be produced stably, and reducing gas of high temperature can be supplied to the exhaust path.

Preferably, the fuel reformer includes a catalyst containing rhodium and ceria.

Preferably, the NOx purification catalyst contains platinum and ceria.

Preferably, a temperature of reducing gas supplied by the fuel reformer is higher than a temperature of exhaust flowing in a portion of the exhaust path to which the reducing gas is supplied by the fuel reformer.

According to this configuration, by supplying reducing gas of a temperature higher than the exhaust, the temperature of the exhaust can be raised, and the NOx purification catalyst can be raised in temperature quickly up to the activation temperature thereof. As a result, it is possible to further improve NOx purification efficiency.

Preferably, the internal combustion engine employs diesel oil as fuel, and combusts the fuel by way of compression ignition.

EXPLANATION OF REFERENCE NUMERALS 1 engine (internal combustion engine)
2 intake plumbing (intake path)
4 exhaust plumbing (exhaust path)
6 exhaust-gas recirculation path (exhaust-gas recirculation path)
12 throttle valve (intake control valve)
20 EGR valve (exhaust-gas recirculation amount control valve)
33 NOx purification catalyst
34 exhaust temperature sensor (temperature detection means)
50 fuel reformer (fuel reformer)
53 reforming catalyst
40 electronic control unit
41 reformer control part (reformer control means)
42 intake/exhaust control part
421 exhaust air-fuel ratio control part (exhaust air-fuel ratio control means)
423 space velocity control part (space velocity control means)
425 oxygen concentration control part (oxygen concentration control means)

PREFERRED MODE FOR CARRYING OUT THE INVENTION

Figure 1:
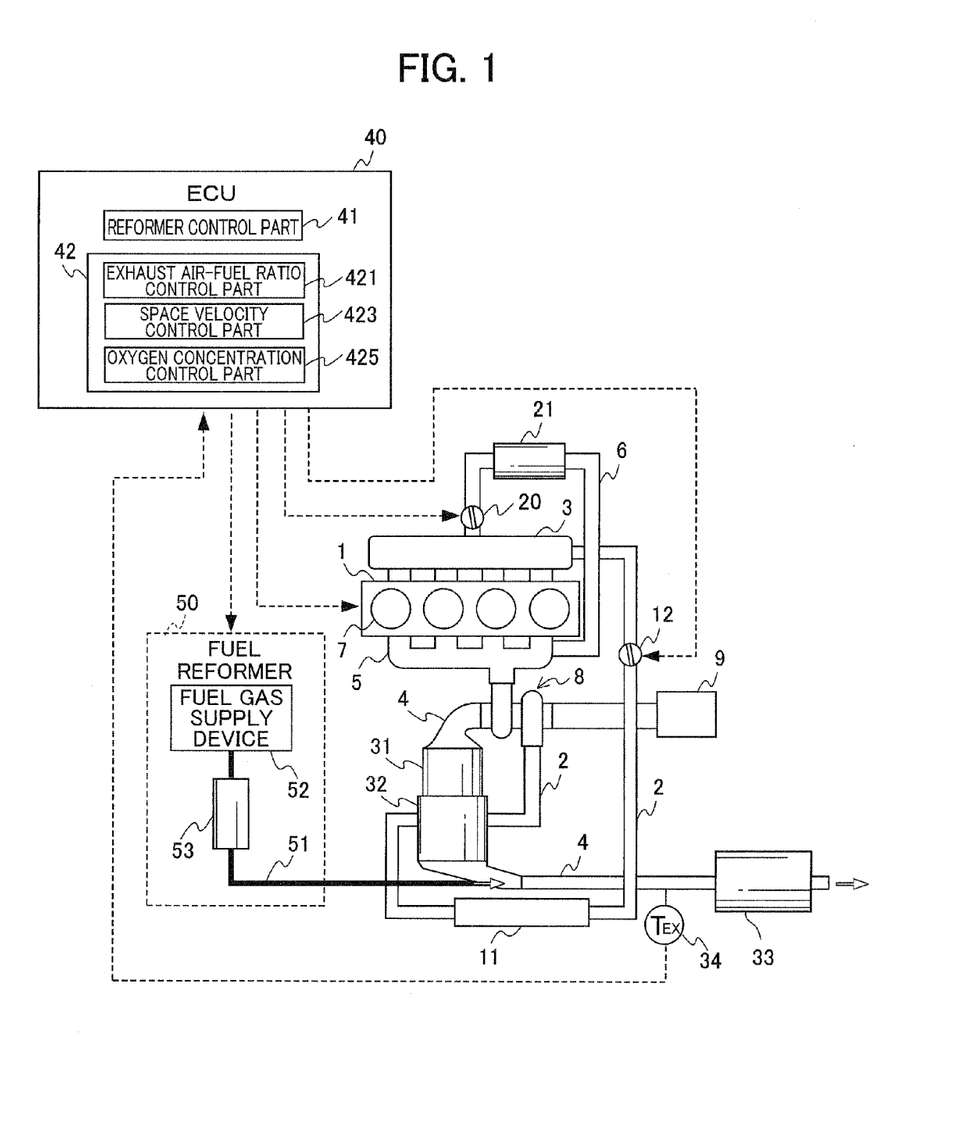
FIG. 1 is a view showing a configuration of an internal combustion engine and an exhaust purification device thereof according to an embodiment of the present invention.

FIG. 1 is a view showing a configuration of an internal combustion engine and the exhaust purification device thereof according to an embodiment of the present invention. An internal combustion engine (hereinafter referred to as "engine") 1 is a diesel engine that directly injects fuel into combustion chambers and combusts the fuel by way of compression ignition, and uses diesel oil as the fuel. In addition, a fuel injector, which is not illustrated, is provided to the combustion chamber of each cylinder 7. These fuel injectors are electrically connected to an electronic control unit (hereinafter referred to as "ECU") 40, and the valve-open duration and the valve-close duration of the fuel injectors, i.e. the fuel injection amount and fuel injection timing, are controlled by the ECU 40.

The engine 1 is provided with intake plumbing 2 as an intake path in which intake air flows, exhaust plumbing 4 as an exhaust path in which exhaust gas flows, an exhaust-gas recirculation path 6 that recirculates a portion of the exhaust in the exhaust plumbing 4 to the intake plumbing 2, and a turbocharger 8 that compresses and feeds intake air to the intake plumbing 2.

The intake plumbing 2 is connected to the intake port of each cylinder 7 of the engine 1 via a plurality of branches of an intake manifold 3. The exhaust plumbing 4 is connected to the exhaust port of each cylinder 7 of the engine 1 via a plurality of branches of an exhaust manifold 5. The exhaust-gas recirculation path 6 branches from the exhaust manifold 5 and leads to the intake manifold 3.

The turbocharger 8 includes a turbine, which is not illustrated, provided to the exhaust plumbing 4, and a compressor, which is not illustrated, provided to the intake plumbing 2. The turbine is driven by the kinetic energy of exhaust gas flowing in the exhaust plumbing 4. The compressor is rotationally driven by the turbine, and compresses and feeds intake air into the intake plumbing 2. In addition, the turbine is provided with a plurality of variable vanes, which are not illustrated, and is configured so that the turbine revolution number (revolution speed) can vary by way of causing the aperture of the variable vanes to change. The vane aperture of the turbine is electromagnetically controlled by the ECU 40.

An intercooler 11 for cooling air thus compressed, and a throttle valve 12 as an intake control valve that controls the flow rate (hereinafter referred to as "intake amount") of air flowing in the intake plumbing 2 are provided downstream of the turbocharger 8 in the intake plumbing 2. The throttle valve 12 is connected to the ECU 40 via an actuator, and the aperture thereof is electromagnetically controlled by the ECU 40. In addition, an air cleaner 9 that filters air drawn in is provided upstream of the turbocharger in the intake plumbing 2.

The exhaust-gas recirculation path 6 connects the exhaust manifold 5 and the intake manifold 3, and recirculates a portion of the exhaust emitted from the engine 1. An EGR cooler 21, which cools exhaust gas that is recirculated, and an EGR valve 20 as a exhaust-gas recirculation amount control valve that controls the flow rate (hereinafter referred to as "exhaust-gas recirculation amount") of exhaust gas being recirculated are provided in the exhaust-gas recirculation path 6. The EGR valve 20 is connected to the ECU 40 via an actuator, which is not illustrated, and the valve aperture thereof is electromagnetically controlled by the ECU 40.

An exhaust gas converter that purifies the exhaust is provided in the exhaust plumbing 4. This exhaust gas converter is configured to contain a catalytic converter 31, a particulate matter collection device (hereinafter referred to as "DPF" (Diesel Particulate Filter)) 32, and a NOx purification catalyst 33, which are provided from an upstream side in the exhaust plumbing 4 in the order of the catalytic converter 31, DPF 32, and NOx purification catalyst 33.

The catalytic converter 31 is equipped with an oxidation catalyst, and purifies exhaust by way of a reaction between this catalyst and exhaust, as well as raises the temperature of the exhaust. More specifically, the catalytic converter 31 is equipped with an oxidation catalyst in which a zeolite that excels in adsorption action of hydrocarbons (HC) and rhodium (Rh), which excels in steam reforming action of HC, have been added to a material in which platinum (Pt) acting as a catalyst has been loaded on an alumina ($Al_2O_3$) support, for example.

The DPF 32 collects, when exhaust flows through the fine pores in the filter walls, soot as particulates with elemental carbon as a main component in exhaust, by way of causing deposition thereof on the surface of the filter walls and in the pores inside the filter walls. For example, a ceramic such as silicon carbide (SiC) and a metallic madreporic body is used as a constituent material of the filter wall.

The NOx purification catalyst 33 purifies NOx in the exhaust. More specifically, this NOx purification catalyst 33 absorbs NOx in the exhaust when the exhaust air-fuel ratio is lean, and reduces and thus purifies the NOx absorbed when the exhaust air-fuel ratio is rich.

The NOx purification catalyst 33 includes platinum (Pt) acting as a catalyst, ceria ($CeO_2$) having a NOx adsorption capacity, and a zeolite having a function of storing ammonia ($NH_3$) in the exhaust as ammonium ions ($NH_4$), supported on an alumina ($Al_2O_3$) support.

In the present embodiment, a material formed by loading a NOx reduction catalyst composed of two layers onto a catalyst support is used as the NOx purification catalyst 33.

The lower layer of the NOx reduction catalyst is formed by producing a slurry by placing a material constituted with 75 (g/L) of a beta zeolite ion-exchanged with iron (Fe) and cerium (Ce), 7 (g/L) of alumina, and 8 (g/L) of a binder into a ball mill with an aqueous medium, then agitating and mixing, followed by coating this slurry on the catalyst support.

In addition, the upper layer of the NOx reduction catalyst is formed by producing a slurry by placing a material constituted with 4.5 (g/L) of platinum, 60 (g/L) of ceria, 60 (g/L) of Ce—Pr—La—Ox, and 20 (g/L) of Zr—Ox into a ball mill with an aqueous medium, then agitating and mixing, followed by coating this slurry on the lower layer described above.

In the NOx purification catalyst 33 formed as described above, when the amount of adsorbed ammonia is small, since the NOx purification ability decreases, supply of a reducing agent (hereinafter referred to as "reduction") to the NOx purification catalyst 33 is performed in order to reduce the NOx appropriately. With this reduction, the reducing agent is supplied to the NOx purification catalyst 33 by making the air-fuel ratio of the mixture inside the combustion chamber to be richer than the theoretical air-fuel ratio by way of increasing the fuel amount injected from the fuel injectors and decreasing the intake air amount with the throttle valve. In other words, by enriching the exhaust air-fuel ratio, the concentration of reducing agent in the exhaust flowing into the NOx purification catalyst 33 becomes higher than the concentration of oxygen, thereby carrying out reduction.

Purification of NOx in this NOx purification catalyst 33 will be explained.

First, the air-fuel ratio of the mixture combusted by the engine 1 is set to be leaner than the theoretical air-fuel ratio, and when so-called lean burn operation is performed, the concentration of reducing agent in the exhaust flowing into the NOx purification catalyst 33 becomes lower than the concentration of oxygen. As a result thereof, nitrogen oxide (NO) and oxygen ($O_2$) react by action of the catalyst, and is adsorbed to ceria as $NO_2$. In addition, carbon monoxide (CO) that has not reacted with oxygen is also adsorbed to ceria.

Next, when reduction to make the concentration of the reducing agent in the exhaust higher than the concentration of oxygen is carried out, carbon dioxide ($CO_2$) and hydrogen ($H_2$) are generated by carbon monoxide in the exhaust reacting with water ($H_2O$), and carbon monoxide (CO) and carbon dioxide ($CO_2$) as well as hydrogen are generated by hydrocarbons (HC) in the exhaust reacting with water. Furthermore, NOx contained in the exhaust and NOx (NO, $NO_2$) adsorbed to ceria (and platinum) react with the hydrogen thus generated by action of the catalyst, thereby generating ammonia ($NH_3$) and water. In addition, the ammonia thus generated here is adsorbed to zeolite in the form of ammonium ions ($NH_4^+$).

Next, lean burn operation is performed in which the air-fuel ratio is set to be leaner than the theoretical air-fuel ratio, and when the concentration of the reducing agent in the exhaust flowing into the NOx purification catalyst 33 is set to be lower than the concentration of oxygen, NOx is adsorbed to ceria. Furthermore, in a state where ammonium ions are adsorbed to the zeolite, NOx and oxygen in the exhaust react with ammonia, thereby generating nitrogen ($N_2$) and water.

In this way, according to the NOx purification catalyst 33, ammonia generated during reducing agent supply is adsorbed to the zeolite, and the ammonia adsorbed during lean burn operation reacts with NOx; therefore, it is possible to perform purification of NOx efficiently.

In addition, a fuel reformer 50, which reforms fuel gas to produce a reducing gas containing hydrogen ($H_2$), carbon monoxide (CO), and hydrocarbons (HC), and then supplies this reducing gas to upstream of the NOx purification catalyst inside the exhaust plumbing 4, is connected between the DPF 32 and the NOx purification catalyst 33 inside the exhaust plumbing 4.

The fuel reformer 50 is configured to include a gas path 51 that connects one end side to the exhaust plumbing 4, a fuel gas supply device 52 that supplies fuel gas from another end side of this gas path 51, and a reforming catalyst 53 as a reforming catalyst provided in the gas path 51.

The fuel gas supply device 52 produces fuel gas by mixing fuel stored in a fuel tank and air supplied by the compressor at a predetermined ratio, and supplies this fuel gas to the gas path 51. This fuel gas supply device 52 is connected to the ECU 40, and a supply amount of fuel gas and a mixture ratio thereof are controlled by the ECU 40.

The reforming catalyst 53 is a catalyst that reforms the fuel gas supplied from the fuel gas supply device 52, and produces a reducing gas containing hydrogen, carbon monoxide, and hydrocarbons. More specifically, this reforming catalyst 53 produces a reducing gas by the partial oxidation reaction of hydrocarbon fuel constituting the fuel gas and air. In addition, as described above, the partial oxidation reaction is an exothermal reaction. As a result, the fuel reformer 50 is able to supply reducing gas of a temperature that is higher than the exhaust at a connection with the gas path 51 into the exhaust plumbing 4.

In addition, this reforming catalyst 53 contains rhodium and ceria. In the present embodiment, a material, which was prepared by weighing fine powders of ceria and rhodium so that the mass ratio of rhodium to ceria was 1%, placing this fine powder into a ball mill along with an aqueous medium, and agitating and mixing to produce a slurry, then coating this slurry on a support made of a Fe—Cr—Al alloy, followed by drying and calcining this for 2 hours at 600° C., is used as the reforming catalyst 53.

In addition, a heater (not illustrated) configured to include a glow plug, spark plug, or the like is connected to the reforming catalyst 53, whereby it is possible to heat the reforming catalyst 53 with startup of the fuel reformer 50. Moreover, the fuel reformer 50 is provided separately from the exhaust plumbing 4. In other words, the fuel gas supply device 52 and reforming catalyst 53 of the fuel reformer 50 are not provided in the exhaust plumbing 4.

An exhaust gas temperature sensor 34 that detects a temperature $T_{EX}$ of exhaust upstream of the NOx purification catalyst 33 inside the exhaust plumbing 4 is connected to the ECU 40, and a detection signal of this sensor is supplied to the ECU 40.

The ECU 40 is provided with an input circuit having functions such as shaping an input signal wave form from various sensors, adjusting a voltage level to a predetermined level, and converting analog signal values to digital signal values, and a central processing unit (hereinafter referred to as "CPU"). Additionally, the ECU 40 is provided with a memory circuit that stores various computational programs executed by the CPU and computational results, etc., and an output circuit that outputs control signals to the fuel reformer 50, throttle valve 12, EGR valve 20, fuel injectors of the engine 1, and the like.

In addition, the ECU 40 is provided with a plurality of control blocks that function by means of a hardware configuration such as this input circuits, CPU, memory circuit, and output circuit. More specifically, the ECU 40 is provided with a reformer control part 41 that controls the fuel reformer 50, and an intake/exhaust control part 42 that controls the throttle valve 12, the EGR valve 20, and fuel injectors of the engine 1.

Figure 2:
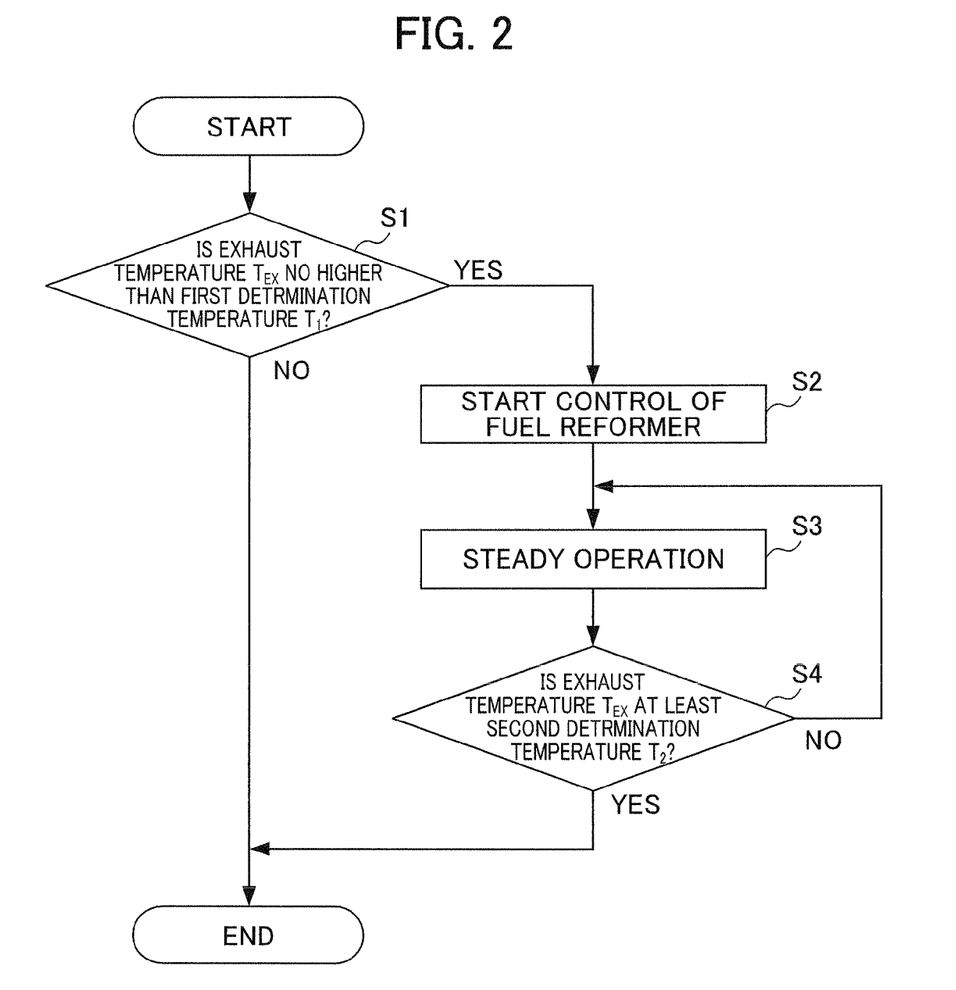
FIG. 2 is a flowchart showing a control sequence of a fuel reformer by way of a reformer control part according to the embodiment.

FIG. 2 is a flowchart showing a control sequence of a fuel reformer by way of the reformer control part 41. Control of the fuel reformer as shown in this flowchart, for example, starts in response to the ignition being turned on.

In Step S1, the exhaust gas temperature $T_{EX}$ is acquired based on output from the exhaust gas temperature sensor, and it is determined whether this exhaust gas temperature $T_{EX}$ is no higher than a predetermined first determination temperature $T_1$. In a case of this determination being YES, Step S2 is advanced to, and in the case of being NO, control of the fuel reformer ends.

In Step S2, supply of reducing gas to the exhaust plumbing is started by starting control of the fuel reformer, and from when a supply amount of the reducing gas per unit time reaches a predetermined target supply amount, the fuel reformer is operated steadily so as to maintain this target supply amount (Step S3). In addition, with this steady operation, a fuel gas supply device is controlled, and reducing gas of a target supply amount is produced by controlling any of the supply amount of air supplied to the reforming catalyst (air supply amount), supply pressure of air (air supply pressure), supply amount of fuel (fuel supply amount), and supply pressure of fuel (fuel supply pressure).

In Step S4, the exhaust gas temperature $T_{EX}$ is acquired based on output from the exhaust gas temperature sensor, and it is determined whether this exhaust gas temperature $T_{EX}$ is at least a predetermined second determination temperature $T_2$. Here, this second determination temperature $T_2$ is set to a value that is larger than the first determination temperature $T_1$ described above. In a case of this determination being YES, supply of reducing gas to the exhaust plumbing is stopped by stopping control of the fuel reformer. In addition, in a case of this determination being NO, Step S3 is advanced to, and steady operation of the fuel reformer is continued.

Referring again to FIG. 1, the intake/exhaust control part 42 is provided with an exhaust air-fuel ratio control part 421, a space velocity control part 423, and an oxygen concentration control part 425.

After supply of reducing gas with the fuel reformer 50 described above, the exhaust air-fuel ratio control part 421 makes the exhaust air-fuel ratio in the exhaust plumbing 4 to be lean and to be rich by way of controlling the main injection amount or post injection amount of fuel injected into the combustion chambers of the engine 1 by driving the fuel injectors of the engine 1, as well as controlling the intake amount by driving the throttle valve 12.

While supplying reducing gas to the exhaust plumbing 4 by way of the fuel reformer 50 described above, the space velocity control part 423 controls the space velocity of exhaust in the NOx purification catalyst 33 by increasing the intake amount or exhaust-gas recirculation amount of the engine 1 by driving the throttle valve 12 or EGR valve 20 to open and close.

While supplying reducing gas to the exhaust plumbing 4 by way of the fuel reformer 50 described above, the oxygen concentration control part 425 controls the oxygen concentration of the exhaust in the NOx purification catalyst 33 by opening and closing the throttle valve 12, EGR valve 20, or fuel injectors of the engine 1 to increase the intake amount, exhaust-gas recirculation amount or fuel injection amount of the engine 1.

Next, control of the space velocity and oxygen concentration of exhaust by way of the space velocity control part and oxygen concentration control part is explained in detail with reference to FIGS. 3 and 4.

Figure 3:
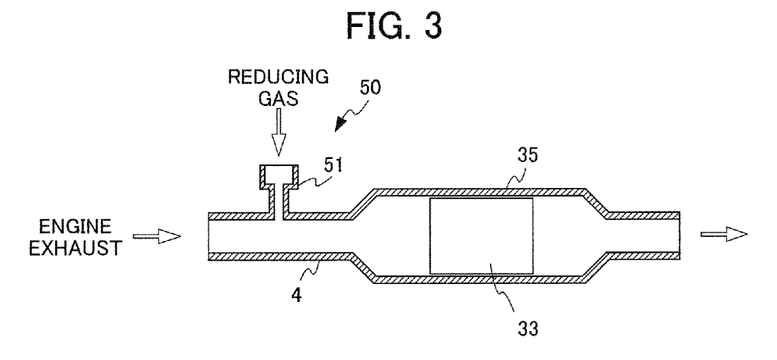
FIG. 3 is a cross-sectional diagram showing a configuration of exhaust plumbing according to the embodiment.

FIG. 3 is a cross-sectional view showing a configuration of the exhaust plumbing 4.

The storage part 35, which accommodates the NOx purification catalyst 33, is formed in the exhaust plumbing 4. In addition, the gas path 51 of the fuel reformer 50 is connected to upstream of the storage part 35 in the exhaust plumbing 4.

As shown in FIG. 3, the reducing gas supplied to the exhaust plumbing 4 from the fuel reformer 50 flows into the NOx purification catalyst 33 provided inside the storage part 35 along with exhaust emitted from the engine.

The space velocity and oxygen concentration of the exhaust emitted from the engine and flowing into the storage part 35 changes according to the operation state of the engine, and more specifically, according to the intake amount, exhaust-gas recirculation amount, and fuel injection amount of the engine. In other words, when the intake amount decreases, the space velocity and oxygen concentration of the exhaust in the storage part 35 decreases. In addition, when the exhaust-gas recirculation amount increases, the space velocity and oxygen concentration of the exhaust in the storage part 35 decreases. Moreover, when the fuel injection amount increases, the oxygen concentration of the exhaust in the storage part 35 decreases.

Additionally, as described above, while the fuel reformer 50 is operated steadily, the reducing gas is supplied at a substantially steady flow rate so as to maintain the target supply amount thereof into the exhaust plumbing 4. Therefore, when the space velocity of the exhaust in the storage part 35 changes, the concentration of reducing gas in the storage part 35 also changes in response thereto. More specifically, the concentration of reducing gas of the exhaust in the storage part 35 becomes high when the space velocity of the exhaust in the storage part 35 decreases.

Figure 4:
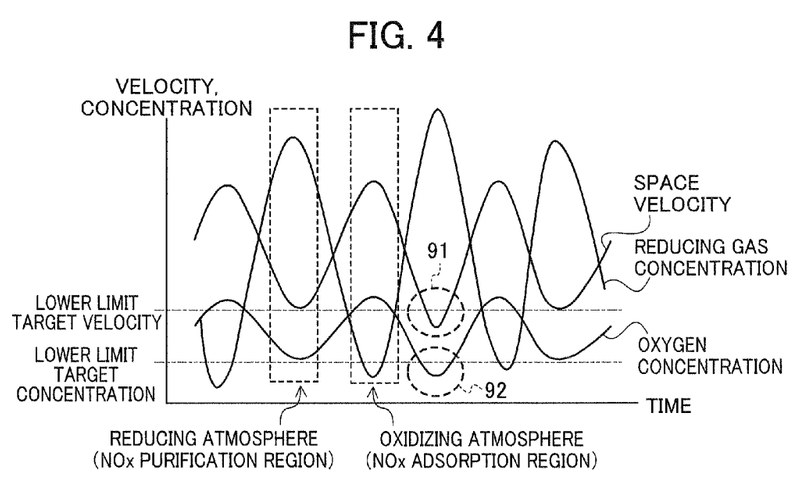
FIG. 4 is a graph showing a relationship of a concentration of reducing gas in exhaust at a storing portion of the exhaust plumbing with the space velocity and concentration of exhaust gas.

FIG. 4 is a graph showing a relationship of a concentration of reducing gas in the exhaust in the storage part of the exhaust plumbing with the space velocity and concentration of the exhaust gas. Herein, the concentration of reducing gas, more specifically, indicates a concentration of hydrogen contained in the reducing gas.

As shown in FIG. 4, the space velocity and oxygen concentration of the exhaust in the storage part fluctuate substantially cyclically along with the operation state of the engine. In such a situation, when the reducing gas is supplied continuously at a constant target supply amount, the concentration of reducing gas in the storage part changes together with the space velocity of the exhaust.

As shown in FIG. 4, in the region in which the space velocity of the exhaust is low, the concentration of reducing gas becomes high, and since the oxygen concentration becomes low, the exhaust in the storage part becomes a reducing atmosphere and a reduction reaction progresses in the NOx purification catalyst. On the other hand, in the region in which the space velocity of the exhaust is high, the concentration of reducing gas becomes low, and since the oxygen concentration becomes high, the exhaust in the storage part becomes an oxidizing atmosphere, and thus the adsorption reaction of NOx progresses in the NOx purification catalyst.

Herein in particular, while supplying reducing gas to the exhaust plumbing by way of the fuel reformer by operating as described above, the space velocity control part decreases the intake amount by closing the throttle valve or increases the exhaust-gas recirculation amount by opening the EGR valve so that the space velocity of the exhaust falls below a predetermined lower limit target velocity, as shown in the dotted line 91 in FIG. 4.

In addition, together with the control of this space velocity control part, the oxygen concentration control part decreases the intake amount by closing the throttle valve, increases the exhaust-gas recirculation amount by opening the EGR valve, or increases the fuel injection amount by opening the fuel injectors so that the oxygen concentration of the exhaust falls below a predetermined lower limit target concentration, as shown in the dotted line 92 in FIG. 4.

In this way, it is possible to improve the purification performance of the NOx purification catalyst while at low temperature by way of performing control such that the space velocity and oxygen concentration of the exhaust falls below the predetermined lower limit targets at least one time, while supplying reducing gas by way of the fuel reformer.

When taken together with the above-mentioned, the exhaust flowing into the NOx purification catalyst is made to be a reducing atmosphere and an oxidizing atmosphere by controlling the main injection amount or post injection amount, after the supply of reducing gas by way of the fuel reformer has been stopped. On the other hand, while reducing gas is being supplied by the fuel reformer, the exhaust flowing into the NOx purification catalyst is made to be a reducing atmosphere or to be an oxidizing atmosphere by controlling the intake amount, exhaust-gas recirculation amount, or fuel injection amount.

As has been explained in detail above, in the present embodiment, in a case where the temperature $T_{EX}$ detected by the exhaust gas temperature sensor 34 is no higher than the first determination temperature $T_1$, control of the fuel reformer 50 is started, and thus supply of reducing gas to the exhaust plumbing 4 is started, and thereafter, in a case where the temperature $T_{EX}$ detected by the exhaust gas temperature sensor 34 is at least the second determination temperature $T_2$, control of the fuel reformer 50 is stopped, and thus the supply of reducing gas to the exhaust plumbing 4 is stopped.

As a result, the exhaust flowing into the NOx purification catalyst 33 can be made to be a reducing atmosphere even in a case in which the temperature of the exhaust or the temperature of the NOx purification catalyst 33 is no higher than the first determination temperature $T_1$ and the exhaust cannot be made a reducing atmosphere by way of methods such as rich combustion, post injection or exhaust injection, by supplying the reducing gas thus produced in the fuel reformer 50. This makes it possible to reduce and purify NOx with the NOx purification catalyst 33 even in a case in which the exhaust is a low temperature immediately after startup of the engine 1.

In addition, by supplying reducing gas to the NOx purification catalyst 33 by operating in this way, reduction and purification of NOx in the NOx purification catalyst 33 is promoted by making the exhaust a reducing atmosphere and it is possible to raise the temperature of the NOx purification catalyst 33 by combusting a portion of the reducing gas herein that is surplus. Therefore, it is possible to quickly raise the temperature of the NOx purification catalyst 33 immediately after startup of the engine 1 and the like, without performing complicated combustion control to raise the temperature of the exhaust and without providing additional equipment.

In addition, the fuel reformer 50 is provided separately from the exhaust plumbing 4. As a result, it is possible to control the fuel reformer 50 and the engine 1 as separate systems. That is to say, in controlling the fuel reformer 50, it becomes unnecessary to control the state of the exhaust emitted from the engine 1. As a result, it becomes possible to control the engine 1 so that the combustion conditions of the engine 1 are in an optimal range. At the same time, it is also possible to operate at optimal conditions by making the fuel reformer 50 independent from control of the engine 1.

In addition, the reformer control part 41 steadily operates the fuel reformer 50 so that the supply amount of reducing gas per unit time to the exhaust plumbing 4 is constant at a target supply amount. In other words, complicated control such as changing the supply amount of reducing gas according to the operation state of the engine 1, state of the exhaust, or the like is not performed. As a result, the structure of the device for control of the fuel reformer 50 is made simple, whereby cost can be reduced.

In addition, after the supply of reducing gas by way of the fuel reformer 50 is stopped, the exhaust air-fuel ratio is made to be lean and rich by controlling the main injection amount or post injection amount. As a result, it becomes possible to continuously purify NOx with the NOx purification catalyst 33 even after the supply of reducing gas has been stopped.

In addition, reducing gas of a target supply amount is produced by controlling any of a supply amount of air supplied to the reforming catalyst 53, a supply pressure of air, a supply amount of fuel, and a supply pressure of fuel. In other words, it is not necessary to perform complicated control in order to produce reducing gas of a constant target supply amount. As a result, the structure of the device for control of the fuel reformer 50 is made simple, whereby cost can be reduced.

In addition, the exhaust in the NOx purification catalyst 33 can be made a reducing atmosphere by decreasing the intake amount or increasing the exhaust-gas recirculation amount so that the space velocity of the exhaust in the NOx purification catalyst 33 falls below a predetermined lower limit target velocity. As a result, it is possible to further promote the reduction and purification of NOx in the NOx purification catalyst 33.

In addition, the exhaust in the NOx purification catalyst 33 can be made a reducing atmosphere by decreasing the intake amount, increasing the exhaust-gas recirculation amount, or increasing the fuel injection amount so that the oxygen concentration of the exhaust in the NOx purification catalyst 33 falls below a predetermined lower limit target concentration. As a result, it is possible to further promote the reduction and purification of NOx in the NOx purification catalyst 33.

Moreover, by producing the reducing gas by way of the partial oxidation reaction, the reducing gas can be produced stably, and reducing gas of high temperature can be supplied to the exhaust path.

In addition, by supplying reducing gas of a temperature higher than the exhaust, the temperature of the exhaust can be raised, and the NOx purification catalyst 33 can be raised in temperature quickly up to the activation temperature thereof. As a result, the NOx purification efficiency can be further improved.

In the present embodiment, the reformer control part 41 of the ECU 40 constitutes a reformer control means, the exhaust air-fuel ratio control part 412 thereof constitutes an exhaust air-fuel ratio control means, the space velocity control part 423 thereof constitutes a space velocity control means, and the oxygen concentration control part 425 thereof constitutes an oxygen concentration control means.

It should be noted that the present invention is not limited to the embodiment described above and can have various modifications.

In the embodiment described above, although an exhaust gas temperature sensor 34 that detects a temperature of exhaust is provided as a temperature detection means, and the fuel reformer 50 is controlled based on a temperature $T_{EX}$ detected by this exhaust gas temperature sensor 34, it is not limited thereto. For example, it may be configured such that, in place of the exhaust gas temperature sensor, a catalyst temperature sensor that detects a temperature $T_{CA}$ of the NOx purification catalyst is provided, and control of the fuel reformer is performed based on the temperature $T_{CA}$ thus detected by this catalyst temperature sensor.

Alternatively, the present invention can also be applied to an exhaust purification device of an engine for marine propulsion or the like such as an outboard motor in which the crank shaft thereof is vertical.

The invention claimed is:

1. An exhaust purification device for an internal combustion engine provided with a NOx purification catalyst that is disposed in an exhaust path of the internal combustion engine, and purifies NOx in exhaust, the device comprising:
   a fuel reformer that is provided separately from the exhaust path, reforms fuel and produces a reducing gas containing carbon monoxide, hydrogen, and hydrocarbons, and supplies the reducing gas upstream of the NOx purification catalyst into the exhaust path;
   a temperature detection means for detecting a temperature of exhaust flowing in the exhaust path, or a temperature of the NOx purification catalyst;
   a reformer control means for starting supply of reducing gas to the exhaust path by starting control of the fuel reformer in a case where the temperature detected by the temperature detection means is no higher than a predetermined first temperature, and stops supply of reducing gas to the exhaust path by stopping control of the fuel reformer in a case where the temperature detected by the temperature detection means becomes at least a second temperature that is higher than the first temperature;
   an intake control valve provided in an intake path of the internal combustion engine;
   an exhaust-gas recirculation amount control valve provided in an exhaust-gas recirculation path that recirculates a portion of exhaust flowing in the exhaust path into the intake path; and
   a space velocity control means for decreasing an intake amount by closing the intake control valve, or increasing an exhaust-gas recirculation amount by opening the exhaust-gas recirculation amount control valve, so that a space velocity of exhaust gas in the NOx purification catalyst falls below a predetermined lower limit target velocity, while supplying reducing gas to the exhaust path by way of the fuel reformer.

2. The exhaust purification device for an internal combustion engine according to claim 1, wherein the reformer control means controls the fuel reformer from when a supply amount of the reducing gas to the exhaust path per unit time reaches a predetermined target supply amount so as to maintain the target supply amount.

3. The exhaust purification device for an internal combustion engine according to claim 1, wherein the NOx purification catalyst absorbs nitrogen oxide in exhaust when an exhaust air-fuel ratio is lean, and reduces the nitrogen oxide thus absorbed when the exhaust air-fuel ratio is rich, and
   further comprising an exhaust air-fuel ratio control means for making the exhaust air-fuel ratio to be lean and to be rich by controlling a main injection amount or post injection amount of fuel injected into a combustion chamber of the internal combustion engine, after supply of the reducing gas by way of the fuel reformer has stopped.

4. The exhaust purification device for an internal combustion engine according to claim 2,
   wherein the fuel reformer includes a reforming catalyst that produces a reducing gas by reforming fuel gas in which air and fuel has been mixed, and
   wherein the reformer control means produces the target supply amount of reducing gas by controlling any of a supply amount of air, a supply pressure of air, a supply amount of fuel, and a supply pressure of fuel supplied to the reforming catalyst.

5. The exhaust purification device for an internal combustion engine according to claim 1, wherein the space velocity of exhaust gas falls below the lower limit target velocity at least one time, while supplying the reducing gas to the exhaust path by way of the fuel reformer.

6. The exhaust purification device for an internal combustion engine according to claim 1, wherein the fuel reformer produces reducing gas by way of partial oxidation reaction of hydrocarbon fuel and air.

7. The exhaust purification device for an internal combustion engine according to claim 1, wherein the fuel reformer includes a catalyst containing rhodium and ceria.

8. The exhaust purification device for an internal combustion engine according to claim 1, wherein the NOx purification catalyst contains platinum and ceria.

9. The exhaust purification device for an internal combustion engine according to claim 1, wherein a temperature of reducing gas supplied by the fuel reformer is higher than a temperature of exhaust flowing in a portion of the exhaust path to which the reducing gas is supplied by the fuel reformer.

10. The exhaust purification device for an internal combustion engine according to claim 1, wherein the internal combustion engine employs diesel oil as fuel, and combusts the fuel by way of compression ignition.

11. An exhaust purification device for an internal combustion engine provided with a NOx purification catalyst that is disposed in an exhaust path of the internal combustion engine, and purifies NOx in exhaust, the device comprising:
    a fuel reformer that is provided separately from the exhaust path, reforms fuel and produces a reducing gas containing carbon monoxide, hydrogen, and hydrocarbons, and supplies the reducing gas upstream of the NOx purification catalyst into the exhaust path;
    a temperature detection means for detecting a temperature of exhaust flowing in the exhaust path, or a temperature of the NOx purification catalyst;
    a reformer control means for starting supply of reducing gas to the exhaust path by starting control of the fuel reformer in a case where the temperature detected by the temperature detection means is no higher than a predetermined first temperature, and stops supply of reducing gas to the exhaust path by stopping control of the fuel reformer in a case where the temperature detected by the temperature detection means becomes at least a second temperature that is higher than the first temperature;
    an intake control valve provided in an intake path of the internal combustion engine;
    an exhaust-gas recirculation amount control valve provided in an exhaust-gas recirculation path that recirculates a portion of exhaust flowing in the exhaust path into the intake path; and
    an oxygen concentration control means for decreasing an intake amount by closing the intake control valve, increasing an exhaust-gas recirculation amount by opening the exhaust-gas recirculation amount control valve, or increasing a fuel injection amount to be injected into a combustion chamber of the internal combustion engine, so that an oxygen concentration of exhaust in the NOx purification catalyst falls below a predetermined lower limit target concentration, while supplying reducing gas to the exhaust path by way of the fuel reformer.

12. The exhaust purification device for an internal combustion engine according to claim 11, wherein the oxygen concentration falls below the lower limit target concentration at least one time, while supplying reducing gas to the exhaust path by way of the fuel reformer.

* * * * *